United States Patent
Qiu et al.

(10) Patent No.: US 12,020,454 B2
(45) Date of Patent: Jun. 25, 2024

(54) IMAGE PROCESSING METHOD AND APPARATUS FOR ELECTRONIC DEVICE, AND ELECTRONIC DEVICE

(71) Applicant: Goertek Inc., Shandong (CN)

(72) Inventors: Tao Qiu, Shandong (CN); Bin Jiang, Shandong (CN); Xiaoyu Chi, Shandong (CN)

(73) Assignee: Goertek Inc., Shandong (CN)

( * ) Notice: Subject to any disclaimer, the term of this patent is extended or adjusted under 35 U.S.C. 154(b) by 386 days.

(21) Appl. No.: 17/617,085

(22) PCT Filed: Sep. 29, 2019

(86) PCT No.: PCT/CN2019/109025
§ 371 (c)(1),
(2) Date: Dec. 7, 2021

(87) PCT Pub. No.: WO2020/248442
PCT Pub. Date: Dec. 17, 2020

(65) Prior Publication Data
US 2022/0237818 A1  Jul. 28, 2022

(30) Foreign Application Priority Data
Jun. 13, 2019 (CN) .......................... 201910510610.9

(51) Int. Cl.
*G06T 19/20* (2011.01)
*G06F 3/04815* (2022.01)
*G06T 7/73* (2017.01)

(52) U.S. Cl.
CPC ............ *G06T 7/73* (2017.01); *G06F 3/04815* (2013.01); *G06T 19/20* (2013.01); *G06T 2207/10016* (2013.01); *G06T 2207/30244* (2013.01); *G06T 2219/2016* (2013.01)

(58) Field of Classification Search
CPC . G06T 7/73; G06T 19/20; G06T 2207/10016; G06T 2207/30244; G06T 2219/2016; G06F 3/04815; G06F 3/147; G06F 1/163; G06F 3/011;
(Continued)

(56) References Cited

U.S. PATENT DOCUMENTS

2018/0018781 A1* 1/2018 Menozzi .............. G02B 27/017

FOREIGN PATENT DOCUMENTS

| CN | 106973283 A | 7/2017 |
| CN | 107807732 A | 3/2018 |

* cited by examiner

*Primary Examiner* — Siamak Harandi
(74) *Attorney, Agent, or Firm* — Baker Botts LLP (57) ABSTRACT

The present application discloses an image processing method and apparatus for an electronic device, and the electronic device. The method includes; acquiring a pose change quantity of the electronic device from a previous frame moment to a current frame moment; judging whether the pose change quantity is less than a set threshold; acquiring, in the case where the pose change quantity is less than the set threshold, to-be-rendered image data at the current frame moment according to a current value of a near viewport distance at the current frame moment; rendering the to-be-rendered image data at the current frame moment to acquire a changed image at the current frame moment; and merging a previous frame of image with the changed image to acquire a current frame of image at the current frame moment.

11 Claims, 6 Drawing Sheets

(58) Field of Classification Search
CPC ............ G06F 2200/1637; G09G 5/393; G09G 2320/0261; H04N 23/60; H04N 23/80
See application file for complete search history.

IMAGE PROCESSING METHOD AND APPARATUS FOR ELECTRONIC DEVICE, AND ELECTRONIC DEVICE

CROSS-REFERENCE TO RELATED APPLICATION

This application is a National Stage of International Application No. PCT/CN2019/109025, filed on Sep. 29, 2019, which claims priority to Chinese Patent Application No. 201910510610.9, filed with the Chinese Patent Office on Jun. 13, 2019 and entitled "IMAGE PROCESSING METHOD AND APPARATUS FOR ELECTRONIC DEVICE, AS WELL AS ELECTRONIC DEVICE", both of which are hereby incorporated by reference in its entirety.

TECHNICAL FIELD

The present application relates to the technical field of image display, and more particularly to an image processing method and apparatus for an electronic device, as well as the electronic device.

BACKGROUND

With the popularization of virtual reality (VR), augmented reality (AR) or mixed reality (MR) electronic devices, more and more people are experiencing virtual reality. In a virtual world, users may play games, become live streamers and watch videos, where a stable frame rate and picture display performance is essential for user experience. If the image displayed is unstable and thus cannot achieve performance as expected, it is highly likely to bring uncomfortableness to the user and degrade the user's experience, resulting in user churn.

However, there are some problems in a current electronic device. Taking a VR device as an example of a head-mounted virtual reality device, when the wearer's head moves in a small amplitude, the electronic device moving along re-renders each frame in the virtual scene as a whole and produces a large amount of data to be rendered, which is likely to cause delay in the rendering of the virtual scene and cause jitters in the electronic device, deteriorating user experience.

SUMMARY

One objective of an embodiment of the present application is to provide an image processing solution for an electronic device.

According to a first aspect of the present application, an image processing method for an electronic device is provided, comprising:

acquiring a pose change quantity of the electronic device from a previous frame moment to a current frame moment;

judging whether the pose change quantity is less than a set threshold;

acquiring, in the case where the pose change quantity is less than the set threshold, to-be-rendered image data at the current frame moment according to a current value of a near viewport distance at the current frame moment, the current value being greater than a set initial value; wherein, the near viewport distance is a distance between, on the one hand, an initial position in a virtual scene where a virtual camera extracts to-be-rendered image data at the corresponding frame moment from image data acquired at each frame moment, and, on the other hand, the virtual camera;

rendering the to-be-rendered image data at the current frame moment to acquire a changed image at the current frame moment; and merging a previous frame of image with the changed image to acquire a current frame of image at the current frame moment.

Alternatively, the to-be-rendered image data at the current frame moment is data required to generate a changed part between the image at the current frame moment and the previous frame of image.

Alternatively, before acquiring the to-be-rendered image data at the current frame moment, the image processing method further comprises:

acquiring the current value of the near viewport distance according to the pose change quantity.

Alternatively, merging the previous frame of image with the changed image to acquire the current frame of image at the current frame moment, comprises:

aligning a center point of the changed image with a center point of the previous frame of image, and replacing a center part of the previous frame of image by the changed image, so as to acquire the current frame of image corresponding to the current frame moment.

Alternatively, the image processing method further comprises:

performing direct rendering to acquire a current frame of image of the electronic device at the current frame moment in the case where the pose change quantity is greater than or equal to the set threshold.

Alternatively, performing direct rendering to acquire the current frame of image of the electronic device at the current frame moment, comprises:

acquiring to-be-rendered image data at the current frame moment according to a set initial value of the near viewport distance, the initial value being a minimum value of the near viewport distance, the near viewport distance being a distance between an initial position of to-be-rendered image data at the corresponding frame moment acquired from image data acquired by a virtual camera in a virtual scene at each frame moment and the virtual camera; and rendering the to-be-rendered image data at the current frame moment to acquire a current frame of image at the current frame moment.

Alternatively, the electronic device further comprises an inertial measurement apparatus, and acquiring the pose change quantity of the electronic device from the previous frame moment to the current frame moment comprises:

acquiring a previous measurement value acquired by the inertial measurement apparatus at the previous frame moment and a current measurement value acquired by the inertial measurement apparatus at the current frame moment;

acquiring an increment change value of a measurement value of the inertial measurement apparatus according to the current measurement value and the previous measurement value; and acquiring the pose change quantity according to the increment change value.

Alternatively, before acquiring the pose change quantity of the electronic device from the previous frame moment to the current frame moment, the image processing method further comprises:

acquiring a current virtual scene of the electronic device in real time;

judging whether the current virtual scene is a three-degree-of-freedom virtual scene or a six-degree-of-freedom virtual scene;

turning of a rotation function of the electronic device in the case where the current virtual scene is the three-degree-of-freedom virtual scene; and maintaining a translation function and the rotation function of the electronic device turned on in the case where the current virtual scene is the six-degree-of-freedom virtual scene.

According to a second aspect of the present application, an image processing apparatus for an electronic device is provided, comprising:

a first acquisition module, configured to acquire a pose change quantity of the electronic device from a previous frame moment to a current frame moment;

a first judgment module, configured to judge whether the pose change quantity is less than a set threshold;

a to-be-rendered data acquisition module, configured to acquire to-be-rendered image data at the current frame moment according to a current value of a near viewport distance at the current frame moment in the case where the pose change quantity is less than the set threshold, the current value being greater than a set initial value, and the near viewport distance is a distance between, on the one hand, an initial position in a virtual scene where a virtual camera extracts to-be-rendered image data at the corresponding frame moment from image data acquired at each frame moment, and, on the other hand, the virtual camera;

a changed image rendering module, configured to render the to-be-rendered image data at the current frame moment to acquire a changed image at the current frame moment; and a merging module, configured to merge a previous frame of image with the changed image to acquire a current frame of image at the current frame moment.

According to a third aspect of the present application, an image processing apparatus for an electronic device is provided, comprising a memory and a processor, the memory is configured to store computer instructions, and the processor is configured to call the computer instruction from the memory and perform the image processing method as defined in any one of the first aspect under the control of the computer instruction.

According to a fourth aspect of the present application, an electronic device is provided, comprising an inertial measurement apparatus, a display screen and the image processing apparatus as defined in any one of the second aspect, wherein the display screen is configured to display each frame of image at each frame moment acquired by the image processing apparatus.

According to an embodiment disclosed in the present application, in the case where the pose change quantity of the electric device is less than a set threshold, to-be-rendered image data at the current frame moment can be determined according to the current value of the near viewport distance at the current frame moment, wherein the current value of the near viewport distance is greater than a set initial value. Then, a changed image at the current frame moment is acquired based on the to-be-rendered image data at the current frame moment, and is further merged with the previous frame of image rendered at the previous frame moment, to acquire a current image at the current frame moment. In this way, when rendering the current frame of image, only the changed part of the image needs to be rendered, and thus the amount of data to be rendered at the current frame moment can be reduced, and the time for calling the data to be rendered can be shortened. Moreover, with the present embodiment, picture display delay due to a large amount of data to be rendered can be avoided, and jitters of the electronic device can also be eliminated, thereby improving user experience.

Other features and advantages of the present application will become apparent from the detailed description for exemplary embodiments of the present application with reference to the following accompanying drawings.

DESCRIPTIONS OF THE DRAWINGS

In order to describe technical solutions in embodiments of the present application or in the prior art more clearly, a brief introduction will be made on the accompanying drawings to be used in the description of embodiments or the prior art. Obviously, the accompanying drawings in the following description are only a part of the drawings of the present application, and based on them, a person of ordinary skill in the art can acquire other drawings without any creative work.

DETAILED DESCRIPTION OF EMBODIMENTS

Technical solutions in the embodiments of the present application are described below with reference to the accompanying drawings in the embodiments of the present application. Apparently, the described embodiments are merely some rather than all of the embodiments of the present application. All other embodiments, acquired by those of ordinary skill in the art based on the embodiments of the present application without any creative work, should fall into the protection scope of the present application.

Technologies, methods and devices known to those of ordinary skill in the related field may not be discussed in detail; however, the technologies, methods and devices should be regarded as a part of the specification where appropriate.

In all examples shown and discussed herein, any specific value should be interpreted as merely exemplary rather than a limitation. Therefore, other examples of the exemplary embodiments may have different values.

It should be noted that similar reference numerals and letters represent similar items in the accompanying drawings below. Therefore, once an item is defined in one drawing, it is unnecessary to further discuss the item in the subsequent drawings.

<Hardware Configuration>

Figure 1:
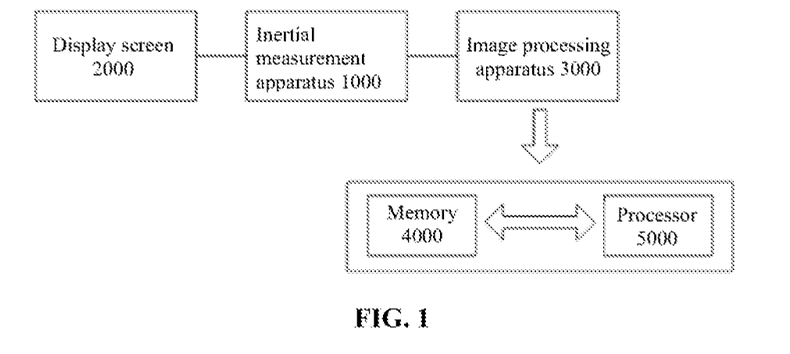
FIG. 1 is a block diagram of a structure of an electronic device according to an embodiment of the present application.

FIG. 1 is a block diagram of a structure of an electronic device according to an embodiment of the present application.

As shown in FIG. 1, the electronic device according to the embodiment of the present application may include an inertial measurement apparatus 1000, a display screen 2000 and an image processing apparatus 3000, wherein the inertial measurement apparatus 11000 may be configured to measure pose changes of the electronic device, the display screen 2000 may be configured to display each frame of image at each frame moment acquired by the image processing apparatus, and the image processing apparatus 3000 may process a current frame of image of the electronic device at the current frame moment according to a method provided by an embodiment of the present application.

In the embodiment of the present application, the electronic device may be an intelligent device such as a virtual reality (VR) device, an augmented reality (AR) device or a mixed reality device.

The inertial measurement apparatus 1000 is also called an inertial measurement unit (IMU), and is an electronic device for measuring and reporting speed, direction and gravity through combination of sensors, wherein the sensors include an acceleration sensor, a gyroscope sensor and a geomagnetic sensor. Since the inertial measurement unit is provided with an accelerometer capable of measuring three degrees of freedom, a gyroscope capable of measuring the three degrees of freedom and a magnetometer capable of measuring the three degrees of freedom, it is also called a nine-axis sensor.

In the embodiment of the present application, the degree of freedom (DoF) is related to movement of a rigid body in the space, and may be explained as "different basic ways that an object moves". There are six degrees of freedom, which may be divided into two different types: translating and rotating. The translating movement represents that the rigid body may translate in three degrees of freedom, specifically, forward/backward, upward/downward and leftward/rightward translating movement. The rotation represents that the rigid body may rotate in three degrees of freedom, specifically pitch, roll and yaw. According to spatial movement states of the electronic device, the virtual scene of the electronic device may include a three-degree-of-freedom virtual scene and a six-degree-of-freedom virtual scene.

In the embodiment of the present application, referring to FIG. 1, the image processing apparatus 3000 may include one or more memories 4000 and one or more processors 5000.

The memory 4000, for example, may include a read-only memory (ROM), a random access memory (RAM), a non-volatile memory such as a hard disk, and the like.

The processor 5000 may be a mobile processor, a single chip, and the like.

The memory 4000 is configured to store instructions which are used to control the processor 5000 to operate to execute a signal processing method according to the embodiment of the present application and can be designed by those skilled in the art according to technical solutions disclosed by the present application. How the instructions control the processor to operate is well known in the art and thus will not be detailed described in the embodiment of the present application.

<Embodiments of the Method>

Figure 2:
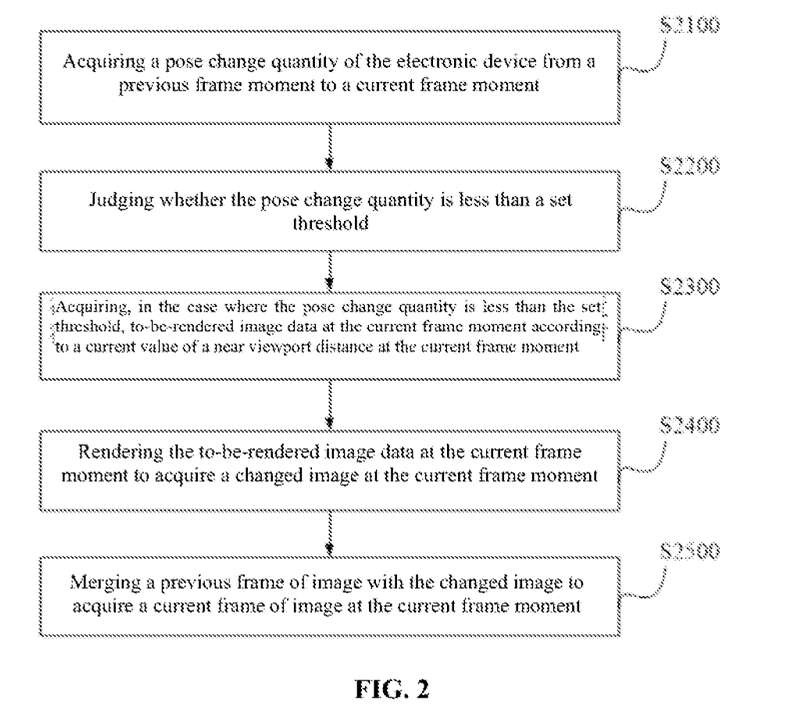
FIG. 2 is a schematic flowchart of an image processing method according to an embodiment of the present application.

FIG. 2 is a schematic flowchart of an image processing method according to an embodiment of the present application.

As shown in FIG. 2, the image processing method for the electronic device according to the embodiment is implemented by an image processing apparatus 3000, and may include the following steps S2100-S2300:

Step S2100: the image processing apparatus 3000 acquires a pose change quantity of the electronic device from a previous frame moment to a current frame moment.

In the embodiment of the present application, the electronic device includes an inertial measurement apparatus 1000 which is an electronic device for measuring and reporting speed, direction and gravity through combination of sensors, wherein the sensors include an acceleration sensor, a gyroscope sensor and a geomagnetic sensor. For example, when a wearer use a VR head-mounted device and the head of the wearer moves, the inertial measurement apparatus 1000 may measure a pose of the YR head-mounted device in real time, that is, a previous measurement value collected by the inertial measurement apparatus 1000 at the previous frame moment and a current measurement value collected by the inertial measurement apparatus 1000 at the current frame moment.

Figure 3:
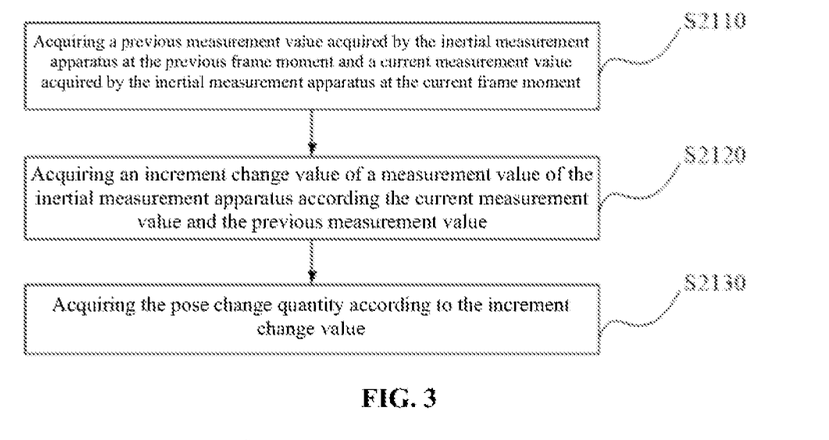
FIG. 3 is a schematic flowchart of an image processing method according to another embodiment of the present application.

As shown in FIG. 3, in the embodiment of the present application, the step S2100 of acquiring the pose change quantity of the electronic device from the previous frame moment to the current frame moment may further include the foll owing steps S2110-S2130:

Step S2110: the image processing apparatus 3000 acquires the previous measurement value collected by the inertial measurement apparatus 1000 at the previous frame moment and the current measurement value collected by the inertial measurement apparatus 1000 at the current frame moment.

In the embodiment of the present application, since the inertial measurement apparatus 1000 includes an acceleration sensor, a gyroscope sensor and a geomagnetic sensor, measurement values of the inertial measurement apparatus 1000 include a speed measurement value, a direction measurement value and a gravity measurement value, and are a coordinate matrix including the speed measurement value, the direction measurement value and the gravity measurement value.

When the position of the electronic device changes, a virtual scene camera of the electronic device moves synchronously with the electronic device, so that the virtual scene changes accordingly. A moment before the virtual scene changes is a previous frame moment, and a moment after the virtual scene changes is a current frame moment. The image processing apparatus 3000 acquires pose change information of the electronic device, that is, the image processing apparatus 3000 acquires the previous measurement value collected by the inertial measurement apparatus 1000 at the previous frame moment and the current measurement value collected by the inertial measurement apparatus 1000 at the current frame moment.

Step S2120: the image processing apparatus 3000 acquires an increment change value of the measurement value of the inertial measurement apparatus according to the current measurement value and the previous measurement value.

In the embodiment of the present application, when the position of the electronic device changes, moving coordinates corresponding to the virtual scene camera of the electronic device is the increment change value of the measurement value acquired by the inertial measurement apparatus 1000 according to the current measurement value and the previous measurement value.

Step S2130: the image processing apparatus 3000 acquires a pose change quantity according to the increment change value.

In the embodiment of the present application, measurement values of the inertial measurement apparatus 1000 are a coordinate matrix including the speed measurement value, the direction measurement value and the gravity measurement value. A coordinate matrix of the increment change value of the measurement values is acquired according to the current measurement value and the previous measurement value by the inertial measurement apparatus 1000, and a value acquired according to the coordinate matrix of the increment change value may represent the pose change quantity of the electronic device. In this embodiment, the pose change quantity of the electronic device may be acquired according to the increment change value of the measurement value of the inertial measurement apparatus 1000.

Step S2200: the image processing apparatus 3000 judges whether the pose change quantity is less than a set threshold.

In the embodiment of the present application, taking the VR head-mounted device as an example, when the wearer's head moves in a small amplitude, that is, the pose change quantity of the electronic device is less than the set threshold, the electronic device on the move re-renders each frame in the virtual scene as a whole and produces a large amount of to-be-rendered data, which is likely to delay the rendering of the virtual scene, lead to jitters in positions of the electronic device and thus affect the user's experience. Based on this, it may determine whether it is necessary to render each frame in the virtual scene by comparing the pose change quantity of the electronic device with the set threshold. In this way, there is no need to render each frame in the virtual scene as a whole in the case where the pose change quantity of the electronic device is small, thus avoiding delay in rendering of the virtual scene.

Step S2300: the image processing apparatus 3000 acquires to-be-rendered image data at the current frame moment according to a current value of a near viewport distance at the current frame moment in the case where the pose change quantity is less than a set threshold, wherein the current value is greater than a set initial value.

In this embodiment, the near viewport distance is a distance between an initial position of to-be-rendered image data at the corresponding frame moment collected from image data acquired by a virtual camera in a virtual scene at each frame moment, and a virtual camera. The near viewport distance is a distance between an initial position in the virtual scene and the virtual camera, wherein the initial position is an initial position where the virtual camera acquires to-be-rendered image data.

Figure 4:
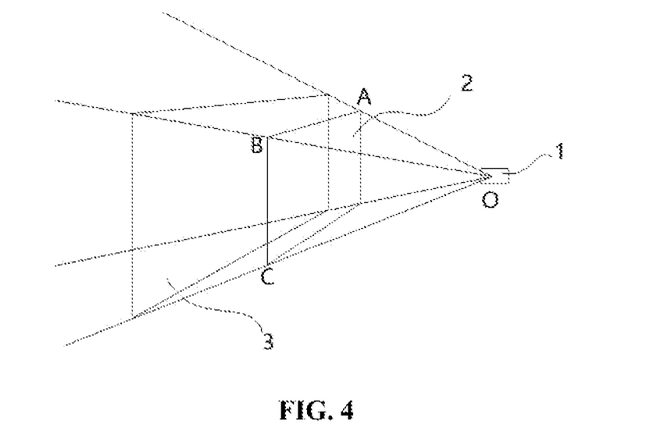
FIG. 4 is a schematic diagram of a virtual scene of an electronic device according to an embodiment of the present application.

FIG. 4 shows a schematic diagram of a virtual scene of an electronic device according to this embodiment. As shown in FIG. 4, in a display system of the electronic device according to the embodiment of the present application, a field of view (FOV) represents an included angle between connecting lines of edges of a display with an observation point. In the figure, ∠AOB is a horizontal field of view, and ∠BOC is a vertical field of view. The horizontal field of view is a range from a leftward observation limit to a rightward observation limit in the case where a virtual camera 1 in the virtual scene does not rotate. The vertical field of view is a range from an upward observation limit to a downward observation limit in the case where the virtual camera 1 in the virtual scene does not rotate. For example, the field of view of the VR head-mounted display usually refers to the horizontal field of view.

In FIG. 4, a view cone refers to an area in the space, and the area determines a space which may be seen by the virtual camera. The view cone is formed by being surrounded by six planes which are also called clip planes. A near viewport 2 and a far viewport 3 are also called a near clip plane and a far clip plane respectively, and the near clip plane and the far clip plane determine a depth range which may be seen by the electronic device.

Figure 5:
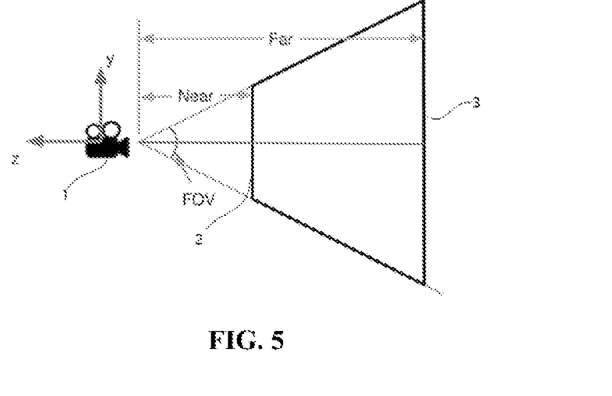
FIG. 5 is a schematic diagram of a near viewport distance in a virtual scene according to an embodiment of the present application.

FIG. 5 shows a schematic diagram of a near viewport distance of a virtual scene according to this embodiment. The near viewport distance represents a distance from a virtual camera 1 to the near viewport 2 (near clip plane). The near viewport distance has an initial value which is an empirical value determined according to a field of view and a pupillary distance of human eyes. The initial value of the near viewport distance may ensure that a picture of the electronic device falls on a display screen of the electronic device. The initial value of the near viewport distance is a minimum value, that is, the closest distance from the near viewport 2 to the virtual camera 1. An image with the near viewport distance less than the initial value cannot be completely displayed on the display screen.

In image processing of the electronic device, the amount of the to-be-rendered data is an amount of data contained in the image displayed by the virtual camera. The amount of the to-be-rendered data is data of a scene model included in a view cone space. That is, the amount of the to-be-rendered data contains data of a scene model included in a space between the near viewport and the far viewport.

The smaller the near viewport distance is, that is, the closer the near viewport 2 is to the virtual camera 1, the more information the picture contains and the larger the amount of the to-be-rendered data is; and the larger the near viewport distance is, that is, the farther the near viewport 2 is away from the virtual camera 1, the less information the picture contains and the smaller the amount of the to-be-rendered data is.

For example, when the pose change of the electronic device is smaller, if directly rendering, at each frame, an image at the near viewport with the near viewport distance being the initial set value, due to the large amount of the to-be-rendered data, it is likely to delay the picture, lead to jitters of the electronic device and affect the user' experience. However, the smaller the pose change of the electronic device is, the greater the change of the image itself at the far viewport is.

In this embodiment, the to-be-rendered image data at the current frame moment is for generating data of an image displayed at the near viewport at the current frame moment. That is, the data of a scene model is included in a space between the near viewport and the far viewport when the near viewport distance is the current value. Wherein the current value is greater than the set initial value. The to-be-rendered image data at the current frame moment represents data required to generate a changed part between the image at the current frame moment and the image at the previous frame.

In this embodiment, by setting the current value of a near viewport distance at the current frame moment, the to-be-rendered image data at the current frame moment is determined according to the current value of the near viewport distance at the current frame moment. In this way, it may reduce the amount of the to-be-rendered data at the current frame moment, shortens the calling time of the to-be-rendered data, and avoids display delay caused by large amount of to-be-rendered data, so as to eliminate jitters of the electronic device and improve the user's experience.

Step S2400: the image processing apparatus 3000 renders the to-be-rendered image data at the current frame moment to acquire a changed image at the current frame moment.

In the embodiment of the present application, the to-be-rendered image data at the current frame moment is the to-be-rendered data of the image displayed at the near viewport with the near viewport distance being the current value, and the image displayed at the near viewport at the current frame moment is rendered to acquire the changed image at the current frame moment.

Step S2500: the image processing apparatus 3000 merges the previous frame of image and the changed image to acquire a current frame of image at the current frame moment.

In this embodiment, merging the previous frame of image and the changed image is to align a center point of the changed image with that of the previous frame of image, and to replace a center part of the previous frame of image by the changed image, so as to acquire the current frame of image corresponding to the current frame moment.

Wherein, the previous frame of image is rendered at the previous frame moment and is an image displayed at the near viewport at the previous frame moment, wherein the near viewport at the previous frame moment is determined by the near viewport distance at the previous frame moment.

When the pose change quantity of the electronic device is less than the set threshold, changes of the image edge portions will not be observed from a user. Therefore, the near viewport distance at the current frame moment is set as the current value, wherein the current value is less than the initial set value.

Further, the changed image at the current frame moment is acquired based on the to-be-rendered image data at the current frame moment, and is merged with the previous frame of image rendered at the previous frame moment to acquire the current image at the current frame moment. In this way, it may reduce the amount of the to-be-rendered data at the current frame moment, shortens the time for calling the to-be-rendered data, and avoids display delay due to large amount of to-be-rendered data, so as to eliminate jitters of the electronic device and improve the user's experience.

In one example of the present application, when the pose change quantity of the electronic device moving to the previous frame moment from an earlier frame moment is greater than or equal to the set threshold, the near viewport distance of the virtual camera of the electronic device at the previous frame moment is the set initial value. Wherein, the earlier frame moment is a frame moment of image before acquiring the previous frame of image. The image displayed at the near viewport at the previous frame moment is an image with a near viewport distance being the initial set value. The current frame of image at the current frame moment is acquired by merging the previous frame of image rendered at the previous frame moment with the changed image rendered by the current frame, and the merged image is equivalent to that the previous frame of image is supplemented with a missing picture of the changed image rendered by the current frame. The current frame of image acquired by merging has the data amount being equivalent to that of the image with the near viewport distance being the initial set value.

In another example of the present application, when the pose change quantity of the electronic device moving to the previous frame moment from an earlier frame moment is less than the set threshold, the near viewport distance of a virtual camera of the electronic device at the previous frame moment is a set value corresponding to the previous frame moment. The value is larger than the initial set value. An image displayed at the near viewport at the previous frame moment is an image with the near viewport distance being the set value corresponding to the previous frame moment. The previous frame of image is an image acquired by merging the image rendered by the previous frame with the earlier frame of image. Wherein, the earlier frame moment is a frame moment of image before acquiring the previous frame of image. The earlier frame of image is an image rendered at the earlier frame of moment. The earlier frame of image is an image equivalent to the image displayed at the near viewport with the near viewport distance being the initial set value. Therefore, the current frame of image at the current frame moment is acquired by merging the previous frame of image merged and rendered at the previous frame time with the changed image rendered by the current frame, and the merged image is equivalent to that the previous frame of image is supplemented with a missing picture of the changed image rendered by the current frame. The current frame of image acquired by merging has the data amount being equivalent to that of the image with the near viewport distance being the initial set value.

In this embodiment, in the case there the pose change quantity of the electric device is less than a set threshold, with setting a current value greater than the original value of the near viewport distance, to-be-rendered image data at the current frame moment can be determined according to the near viewport distance at the current frame moment, wherein the current value of the near viewport distance is greater than a set initial value. Then, a changed image at the current frame moment is acquired based on the to-be-rendered image data at the current frame moment, and is further merged with the previous frame of image rendered at the previous frame moment, to acquire a current image at the current frame moment this way, when rendering the current frame of image, only the changed part of the image needs to be rendered, and thus the amount of data to be rendered at the current frame moment can be reduced, and the time for calling the data to be rendered can be shortened. Moreover, with the present embodiment, picture display delay due to a large amount of data to be rendered can be avoided, and jitters of the electronic device can also be eliminated, thereby improving user experience.

Figure 6:
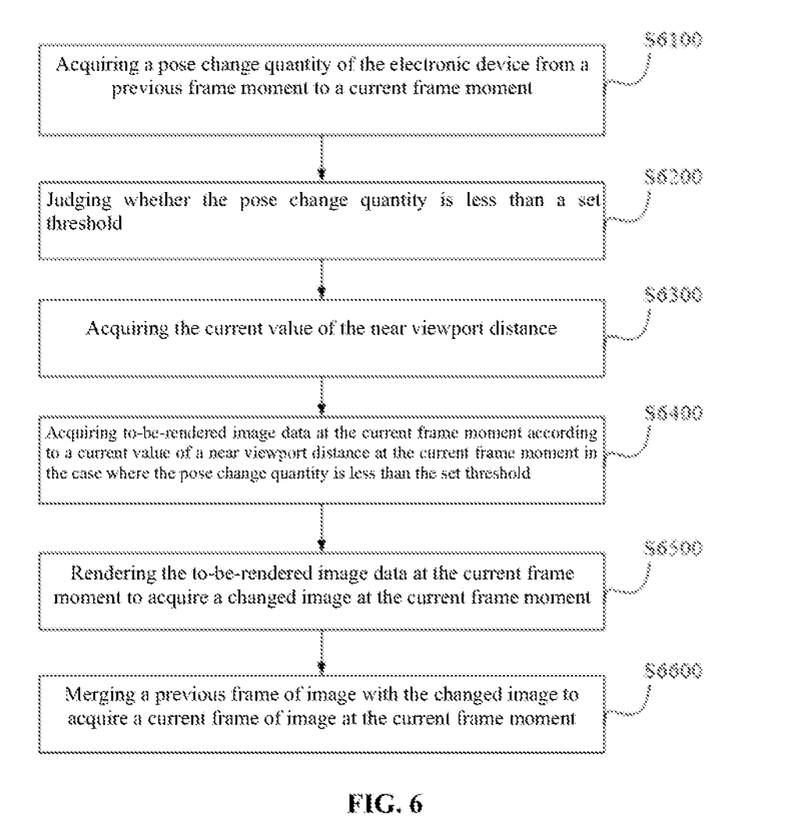
FIG. 6 is a schematic flowchart of an image processing method according to a fourth embodiment of the present application.

As shown in FIG. 6, the embodiment of the present application adds a step S6300 based on the embodiment shown in FIG. 4. The method may include the following steps: S6100-S6500.

Step S6100: the image processing apparatus 3000 acquires a pose change quantity of the electronic device from a previous frame moment to a current frame moment;

Step S6200: judging whether the pose change quantity is less than a set threshold; and Step S6300: the image processing apparatus 3000 acquires the current value of the near viewport distance according to the pose change quantity.

The amount of the to-be-rendered data of the image displayed at the near viewport is equivalent to data of a scene model included in a space between the near viewport and a far viewport. The smaller the near viewport distance is, that is, the closer the near viewport is to the virtual camera, the more information the picture contains and the larger the amount of the to-be-rendered data is; and the larger the near viewport distance is, that is, the farther the near viewport is away from the virtual camera, the less information the picture contains and the smaller the amount of the to-be-rendered data is.

In the case where the pose change quantity is less than the set threshold:

in one example of the present application, the current value of the near viewport distance may be preset fixed value, and the fixed value is less than the initial value;

in another example of the present application, the current value of the near viewport distance may be determined according to the pose change quantity. For example, the smaller the pose change quantity is, the larger the current value is and the smaller the amount of data needing to be rendered is.

Step S6400: rendering the to-be-rendered image data at the current frame moment to acquire a changed image at the current frame moment.

Step S6500: merging the previous frame of image with the changed image to acquire a current frame of image at the current frame moment.

Figure 7:
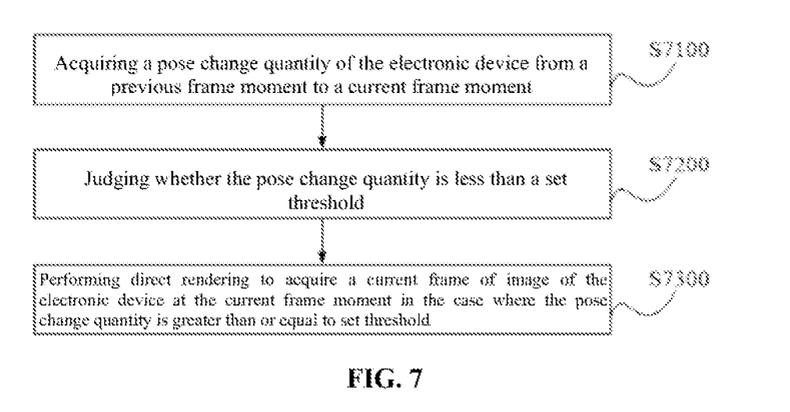
FIG. 7 is a schematic flowchart of an image processing method according to a fifth embodiment of the present application.

As shown in FIG. 7, the image processing method for the electronic device according to the embodiment of the present application may further include the following steps S7100-S7300:

Step S7100: the image processing apparatus 3000 acquires a pose change quantity of the electronic device from a previous frame moment to a current frame moment.

Step S7200: the image processing apparatus 3000 judges whether the pose change quantity is less than a set threshold.

Step S7300: the image processing apparatus 3000 performs direct rendering to acquire a current frame of image of the electronic device at the current frame moment in the case where the pose change quantity is greater than or equal to the set threshold.

Figure 8:
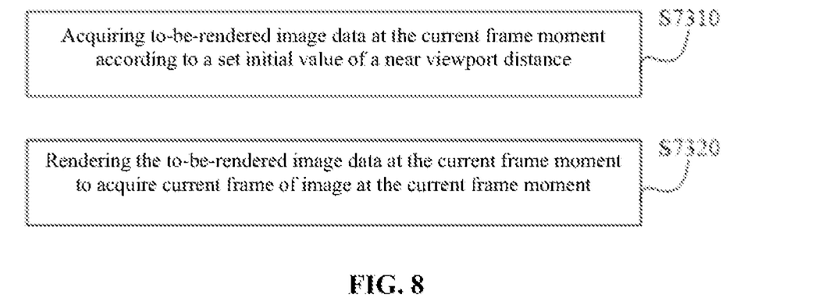
FIG. 8 is a schematic flowchart of an image processing method according to a sixth embodiment of the present application.

As shown in FIG. 8, in the embodiment of the present application, the step S7300 of performing direct rendering to acquire the current frame of image of the electronic device at the current frame moment in the case where the pose change quantity is greater than or equal to the set threshold may further include the following steps S7310-S7320:

Step S7310: the image processing apparatus 3000 acquires to-be-rendered image data at the current frame moment according to a set initial value of the near viewport distance, wherein the initial value is a minimum value of the near viewport distance.

The near viewport distance is a distance between an initial position in a virtual scene where a virtual camera acquires to-be-rendered image data at the corresponding frame moment from image data collected at each frame moment, and the virtual camera.

Step S7320: the image processing apparatus 3000 renders the to-be-rendered image data at the current frame moment to acquire a current frame of image at the current frame moment.

In the embodiment of the present application, the near viewport distance is a distance between the near viewport and the virtual camera of the virtual scene, and its initial value of the near viewport distance is an empirical value which is determined according to a field of view and a pupillary distance of human eyes. Therefore, in order to ensure that a picture of the electronic device falls on the display screen of the electronic device, the initial value of the near viewport distance is a minimum value, that is, the closest distance to the virtual camera.

When the pose change of the electronic device is smaller, if directly rendering, at each frame, an image at the near viewport with the near viewport distance being the initial value, due to the large amount of the to-be-rendered data, it is likely to delay the picture, lead to jitters of the electronic device and affect the user's experience.

The larger the pose change of a virtual device is, the larger the amount of data needing to be rendered in the picture itself and thus the longer the calling time is. Therefore, the direct render may be performed on the image displayed at the near viewport with the near viewport distance being the initial value.

Figure 9:
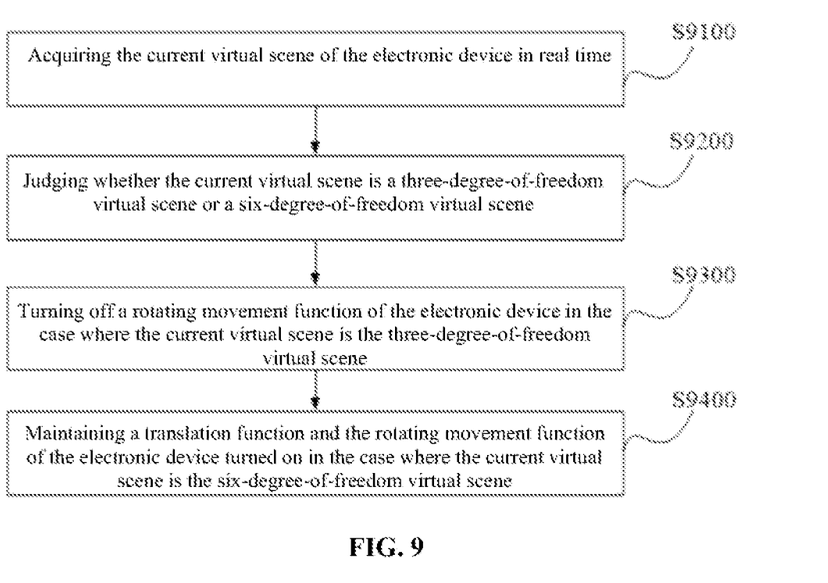
FIG. 9 is a schematic flowchart of an image processing method according to a seventh embodiment of the present application.

As shown in FIG. 9, the image processing method for the electronic device according to the embodiment of the present application may further include the following steps S9100-S9400 before the step of acquiring the pose change quantity of the electronic device from the previous frame moment to the current frame moment:

Step S91100: the image processing apparatus 3000 acquires a current virtual scene of the electronic device in real time.

Step S9200: the image processing apparatus 3000 judges whether the current virtual scene is a three-degree-of-freedom virtual scene of a six-degree-of-freedom virtual scene.

Step S9300: the image processing apparatus 3000 turns off a rotation function of the electronic device in the case where the current virtual scene is the three-degree-of-freedom virtual scene.

Step S9400: the image processing apparatus 3000 maintains a translation function and the rotation function of the electronic device turned on in the case where the current virtual scene is the six-degree-of-freedom virtual scene.

In the embodiment of the present application, the virtual scene of the electronic device may include the three-degree-of-freedom virtual scene and the six-degree-of-freedom virtual scene. Under the condition of the three-degree-of-freedom virtual scene, the movement of the electronic device only includes a translating movement and does not include a rotation, that is, the electronic device may translate in three degrees of freedom, specifically, forward/backward, upward/downward and leftward/rightward translating movement. According to this embodiment, under the condition of the three-degree-of-freedom virtual scene, the rotation function of the electronic device is turned off, that is, a spatial displacement function of the virtual camera of the virtual scene is turned off and an angle change function of three degrees of freedom is only maintained, so that it can further avoid jitters influence caused by the spatial position movement.

In this embodiment, in the case where the pose change quantity of the electric device is less than a set threshold, with setting a current value greater than the original value of the near viewport distance, to-be-rendered image data at the current frame moment can be determined according to the near viewport distance at the current frame moment, wherein the current value of the near viewport distance is greater than a set initial value. Then, a changed image at the current frame moment is acquired based on the to-be-rendered image data at the current frame moment, and is further merged with the previous frame of image rendered at the previous frame moment, to acquire a current image at the current frame moment, in this way, when rendering the current frame of image, only the changed part of the image needs to be rendered, and thus the amount of data to be rendered at the current frame moment can be reduced, and the time for calling the data to be rendered can be shortened. Moreover, with the present embodiment, picture display delay due to a large amount of data to be rendered can be avoided, and jitters of the electronic device can also be eliminated, thereby improving user experience.

<Embodiments of Apparatus>

Figure 10:
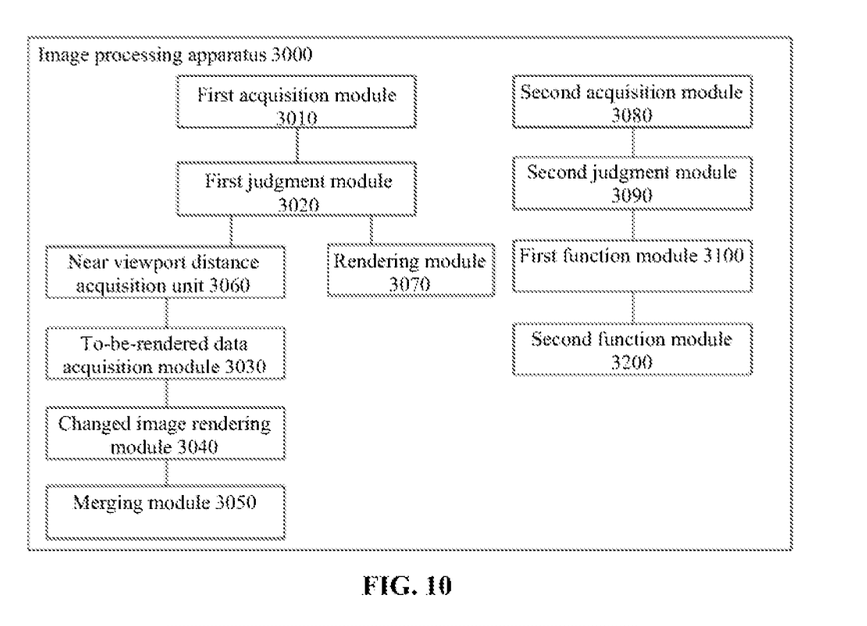
FIG. 10 is a schematic functional block diagram of an image processing apparatus according to an embodiment of the present application.

FIG. 10 is a schematic functional block diagram of an image processing apparatus according to an embodiment of the present application.

In the embodiment of the present application, as shown in FIG. 10, the image processing apparatus 3000 may include a first acquisition module 3010, a first judgment module 3020, a to-be-rendered data acquisition module 3030, a changed image rendering module 3040 and a merging module 3050, and is configured to implement the image processing method provided in this embodiment which will not be elaborated herein.

The first acquisition module 3010 may acquire a pose change quantity of the electronic device from a previous frame moment to a current frame moment.

The first judgment module 3020 may be configured to judge whether the pose change quantity is less than a set threshold.

The to-be-rendered data acquisition module 3030 may be configured to acquire to-be-rendered image data at the current frame moment according to a current value of a near viewport distance at the current frame moment in the case where the pose change quantity is less than the set threshold.

The near viewport distance is a distance between an initial position of to-be-rendered image data at the corresponding frame moment extracted from image data collected by a virtual camera in a virtual scene at each frame moment and the virtual camera, wherein the current value is greater than a set initial value.

The changed image rendering module 3040 may be configured to render the to-be-rendered image data at the current frame moment to acquire a changed image at the current frame moment.

The merging module 3050 may be configured to merge the previous frame of image and the changed image to acquire the current frame at the current frame moment.

In one embodiment of the present application, the merging module 3050 may also be configured to align a center point of the changed image with a center point of the previous frame of image, and replace a center part of the previous frame of image by the changed image to acquire the current frame of image corresponding to the current frame moment.

In one embodiment of the present application, the first acquisition module 3010 may include a measurement unit 3011, an increment change value determining unit 30112 and a pose change quantity acquisition unit 3013.

The measurement unit 3011 may be configured to acquire a previous measurement value collected by an inertial measurement apparatus at the previous frame moment and a current measurement value collected by the inertial measurement apparatus at the current frame moment.

The increment change value determining unit 3012 may be configured to acquire an increment change value of a measurement value of the inertial measurement apparatus according the current measurement value and the previous measurement value.

The pose change quantity acquisition unit 3013 may be configured to acquire the pose change quantity according to the increment change value.

In one embodiment of the present application, the image processing apparatus 3000 may further include a near viewport distance acquisition unit 3060.

The near viewport distance acquisition unit 3060 may be configured to acquire the current value of the near viewport distance according to the pose change quantity.

In one embodiment of the present application, the image processing apparatus 3000 may further include a rendering module 3070.

The rendering module 3070 may be configured to perform direct rendering to acquire a current frame of image of the electronic device at the current frame moment in the case where the pose change quantity is greater than or equal to the set threshold.

In one embodiment of the present application, the rendering module 3070 may include a data acquisition unit 3071 and a rendering unit 3072.

The data acquisition unit 3071 may be configured to acquire to-be-rendered image data at the current frame moment according to a set initial value of a near viewport distance.

The near viewport distance is a distance between an initial position of to-be-rendered image data at the corresponding frame moment acquired from image data collected by a virtual camera in a virtual scene at a corresponding frame moment and the virtual camera, and the initial value is a minimum value of the near viewport distance.

The rendering module 3720 may be configured to render the to-be-rendered image data at the current frame moment to acquire the current frame of image at the current frame movement.

In one embodiment of the present application, the image processing apparatus 3000 may further include a second acquisition module 3080, a second judgment module 3090, a first function module 3100 and a second function module 3200.

The second acquisition module 3080 may be configured to acquire a current virtual scene of the electronic device in real time.

The second judgment module 3090 may be configured to judge whether the current virtual scene is a three-degree-of-freedom virtual scene or a six-degree-of-freedom virtual scene.

The first function module 3100 may be configured to turn off a rotation function of the electronic device in the case where the current virtual scene is the three-degree-of-freedom virtual scene.

The second function module 3200 may be configured to maintain a translation function and the rotation function of the electronic device turned on in the case where the current virtual scene is the six-degree-of-freedom virtual scene.

Figure 11:
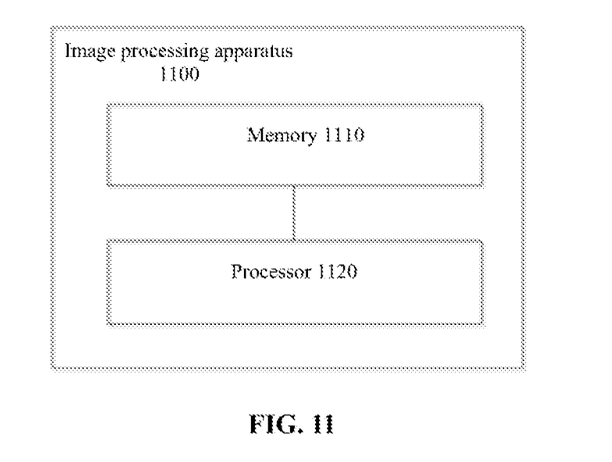
FIG. 11 is a schematic functional block diagram of an image processing apparatus according to another embodiment of the present application.

In this embodiment, another image processing apparatus 1100 for an electronic device is further provided. As shown in FIG. 11, the image processing device includes:

a memory 1110, configured to store executable instructions; and a processor 1120 configured to operate the electronic device to perform the image processing method provided by this embodiment according to control of the executable instructions.

In this embodiment, the image processing apparatus 1100 may be a module with image processing in an intelligent device such as a virtual reality (VR) device, an augmented reality (AR) device or a mixed reality device.

<Embodiment of an Electronic Device>

As shown in FIG. 1, in this embodiment, an electronic device is further provided. The electronic device includes:

an inertial measurement apparatus 1000 may be configured to measure pose change of a virtual device.

In this embodiment, the inertial measurement apparatus 1000 is also called an inertial measurement unit (IMU). The inertial measurement unit is an electronic device for measuring and reporting speed, direction and gravity through combination of sensors.

A display screen 2000 may be configured to display each frame of image at each frame moment acquired by the image processing apparatus. For example, the display screen 2000 may be a mobile phone.

The image processing apparatus 3000 may be an image processing apparatus shown in FIG. 10, or may be an image processing apparatus shown in FIG. 11.

In this embodiment, the electronic device may be an intelligent device such as a virtual reality (VR) device, an augmented reality (AR) device or a mixed reality device. The image processing apparatus 1100 may be a module with an image processing function in the electronic device, for example, a chip of the electronic device directly performing the image processing method corresponding to this embodiment, which will not be elaborated herein.

<Example>

Figure 12:
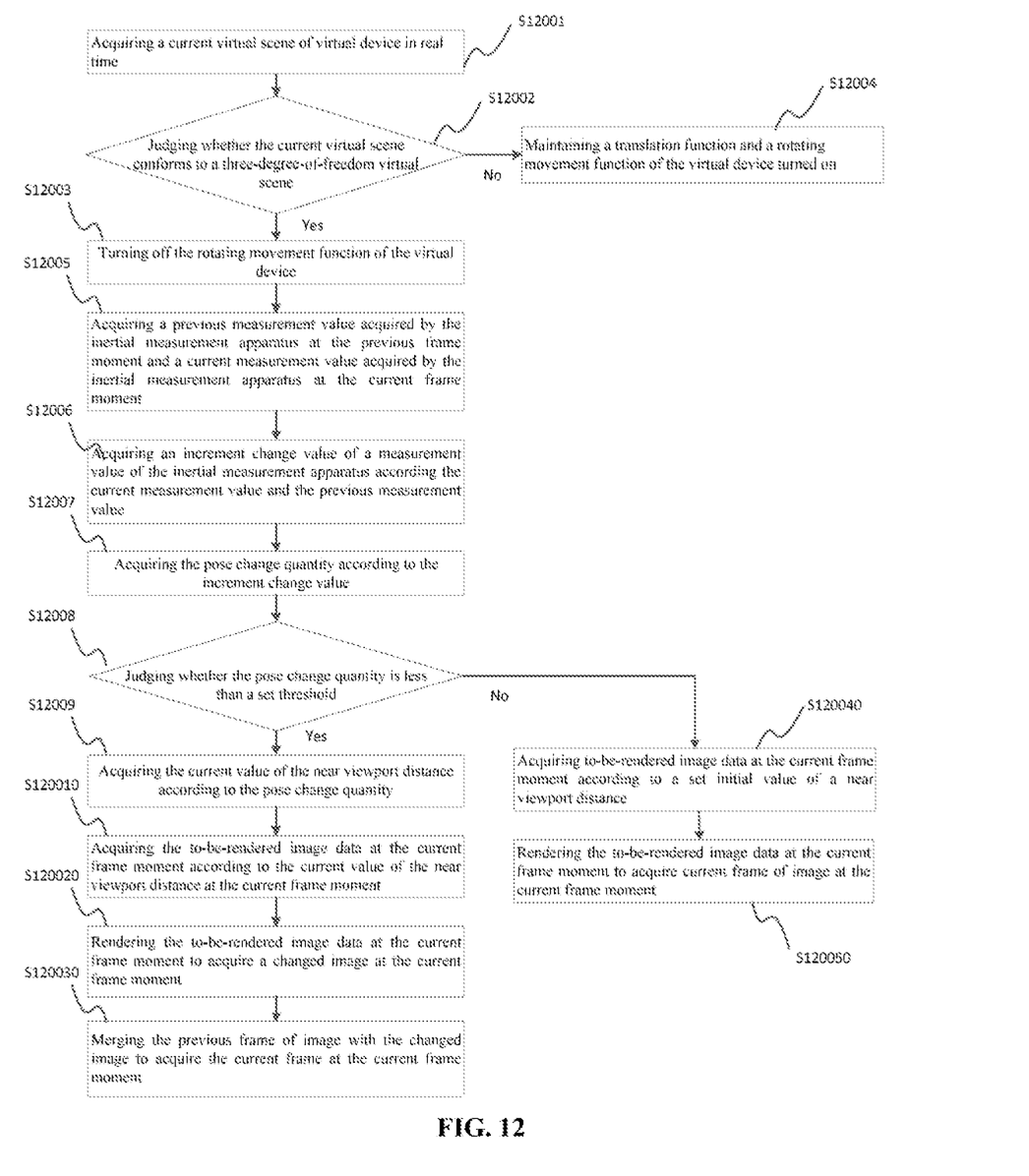
FIG. 12 is a schematic flowchart of an image processing method according to an example of the present application.

FIG. 12 is a schematic flowchart of an image processing method according to one example of the present application. The image processing method may include the following steps:

Step S12001: the image processing apparatus 3000 acquires a current virtual scene of the electronic device in real time.

Step S12002: the image processing apparatus 3000 judges whether the current virtual scene conforms to a three-degree-of-freedom virtual scene. If the current virtual scene conforms to the three-degree-of-freedom virtual scene, a step S12003 is performed; and otherwise, a step S12004 is performed.

Step S12003: turning off a rotation function of the electronic device and then performing a step S12005.

Step S12004: maintaining a translation function and the rotation function of the electronic device turned on, and then performing the step S12005.

Step S12005: the image processing apparatus 3000 acquires the previous measurement value collected by the inertial measurement apparatus 1000 at the previous frame moment and the current measurement value collected by the inertial measurement apparatus 1000 at the current frame moment.

Step S12006: the image processing apparatus 3000 acquires an increment change value of the measurement value of the inertial measurement apparatus according to the current measurement value and the previous measurement value.

Step S12007: the image processing apparatus 3000 acquires a pose change quantity according to the increment change value.

Step S12008: the image processing apparatus 3000 judges whether the pose change quantity is less than a set threshold. If it is judged that the pose change quantity is less than the set threshold, a step S12009 is performed, and otherwise, a step S12040 is performed.

Step S12009: acquiring the current value of the near viewport distance according to the pose change quantity.

Step S12010: the image processing apparatus 3000 acquires the to-be-rendered image data at the current frame moment according to the current value of the near viewport distance at the current frame moment.

Step S12020: the image processing apparatus 3000 renders the to-be-rendered image data at the current frame moment to acquire a changed image at the current frame moment.

Step S12030: the image processing apparatus 3000 merges the previous frame of image and the changed image to acquire a current frame of image at the current frame moment.

Step S12040: acquiring to-be-rendered image data at the current frame moment according to a set initial value of a near vies port distance.

Step S12050: the image processing apparatus 3000 renders the to-be-rendered image data at the current frame moment to acquire a current frame of image at the current frame moment.

The above embodiments mainly focus on the differences from other embodiments, however, it should be clear to those skilled in the art that the above embodiments may be used alone or in combination with each other as required.

In this specification, various embodiments are described in a parallel or progressive manner. Each embodiment focuses on the differences from other embodiments. The same or similar part between the embodiments may be referenced to each other. For the apparatus disclosed by the embodiment, the apparatus corresponds to the method disclosed by the embodiment, so the description is relatively simple, and reference may be made to the method description.

Those of ordinary skill in the art may also understand that units and algorithm steps of each example described in the embodiment disclosed in this specification can be implemented through electronic hardware, computer software or a combination of the two. In order to describe the interchangeability of hardware and software clearly, the composition and steps of each example has been generally described according to functions in the above description. Whether the functions are performed by hardware or software depends on specific applications and design constraint conditions of the technical solutions. Those skilled in the art may use different methods to implement the described functions for each specific application, but such implementation should not be considered to be beyond the scope of the present application.

The steps of the method or algorithm described in combination with the embodiment disclosed in the specification may be directly implemented a software module performed by the hardware and the processor or a combination of the two. The software module may be arranged in a random access memory (RAM), a memory, a read-only memory (ROM), an electrically programmable ROM, an electrically erasable programmable ROM, a register, a hard disk, a removable disk, a CD-ROM, or any other forms of storage mediums known in the technical field.

It should further be noted that the relationship terms, such as "first" and "second", are used herein only for distinguishing one entity or operation from another entity or operation but do not necessarily require or imply that there exists any actual relationship or sequence of this sort between these entities or operations. Furthermore, terms "include", "comprise", or any other variations thereof are intended to cover non-exclusive including, so that a process, a method, an article, or a device including a series of elements not only includes those elements, but also includes other elements that are not explicitly listed, or further includes inherent elements of the process, the method, the article, or the device. Without more restrictions, the elements defined by the sentence "including a . . ." do not exclude the existence of other identical elements in the process, method, article, or device including the elements.

The invention claimed is:

1. An image processing method for an electronic device, comprising:

acquiring a pose change quantity of the electronic device from a previous frame moment to a current frame moment;

determining, by a processor, whether the pose change quantity is less than a set threshold;

acquiring, if the pose change quantity is less than the set threshold, to-be-rendered image data at the current frame moment according to a current value of a near viewport distance at the current frame moment, the current value being greater than a set initial value; wherein, the near viewport distance comprises a distance between an initial position in a virtual scene where a virtual camera extracts to-be-rendered image data at a corresponding frame moment from image data acquired at each frame moment, and the virtual camera;

rendering the to-be-rendered image data at the current frame moment to acquire a changed image at the current frame moment; and merging a previous frame of image with the changed image to acquire a current frame of image at the current frame moment.

2. The method according to claim 1, wherein the to-be-rendered image data at the current frame moment comprises data to generate a changed part between the image at the current frame moment and the previous frame of image.

3. The method according to claim 1, further comprising:
acquiring the current value of the near viewport distance according to the pose change quantity before acquiring the to-be-rendered image data at the current frame moment.

4. The method according to claim 1, wherein merging the previous frame of image with the changed image to acquire the current frame of image at the current frame moment, comprises:

aligning a center point of the changed image with a center point of the previous frame of image, and replacing a center part of the previous frame of image by the changed image, so as to acquire the current frame of image corresponding to the current frame moment.

5. The method according to claim 1, further comprising:
performing direct rendering to acquire a current frame of image of the electronic device at the current frame moment if the pose Change quantity is greater than or equal to the set threshold.

6. The method according to claim 5, wherein performing direct rendering to acquire the current frame of image of the electronic device at the current frame moment, comprises:

acquiring to-be-rendered image data at the current frame moment according to a set initial value of the near viewport distance, the initial value being a minimum value of the near viewport distance, the near viewport distance being a distance between an initial position of to-be rendered image data at the corresponding frame moment acquired from image data acquired by a virtual camera in a virtual scene at each frame moment and the virtual camera; and rendering the to-be-rendered image data at the current frame moment to acquire a current frame of image at the current frame moment.

7. The method according to claim 1, wherein the electronic device further comprises an inertial measurement apparatus, and wherein acquiring the pose change quantity of the electronic device from the previous frame moment to the current frame moment comprises:

acquiring a previous measurement value acquired by the inertial measurement apparatus at the previous frame moment and a current measurement value acquired by the inertial measurement apparatus at the current frame moment;

acquiring an increment change value of a measurement value of the inertial measurement apparatus according to the current measurement value and the previous measurement value; and acquiring the pose change quantity according to the increment change value.

8. The method according to claim 1, wherein before acquiring the pose change quantity of the electronic device from the previous frame moment to the current frame moment, the method further comprises:

acquiring a current virtual scene of the electronic device in real time;

judging whether the current virtual scene is a three-degree-of-freedom virtual scene or a six-degree-of-freedom virtual scene;

turning off a rotation function of the electronic device if the current virtual scene is the three-degree-of-freedom virtual scene; and maintaining a translation function and the rotation function of the electronic device turned on if the current virtual scene is the six-degree-of-freedom virtual scene.

9. An image processing apparatus for an electronic device, comprising:

a first acquisition module, configured to acquire a pose change quantity of the electronic device from a previous frame moment to a current frame moment;

a first judgment module, coupled to the first acquisition module and configured to determine whether the pose change quantity is less than a set threshold;

a to-be-rendered data acquisition module, coupled to the first judgement module and configured to acquire to-be-rendered image data at the current frame moment according to a current value of a near viewport distance at the current frame moment if the pose change quantity is less than the set threshold, the current value being greater than a set initial value, wherein the near viewport distance comprises a distance between an initial position in a virtual scene where a virtual camera extracts to-be-rendered image data at a corresponding frame moment from image data acquired at each frame moment, and the virtual camera;

a changed image rendering module, coupled to the to-be-rendered acquisition module and configured to render the to-be-rendered image data at the current frame moment to acquire a changed image at the current frame moment; and a merging module, coupled to the changed image rendering module and configured to merge a previous frame of image with the changed image to acquire a current frame of image at the current frame moment.

10. An image processing apparatus for an electronic device, comprising a memory and a processor, wherein the memory is configured to store computer instructions, and the processor is configured to call the computer instructions from the memory and perform the image processing method of claim 1 under the control of the computer instructions.

11. An electronic device, comprising an inertial measurement apparatus, a display screen and the image processing apparatus of claim 9, the display screen being configured to display each frame of image at each frame moment acquired by the image processing apparatus.

\* \* \* \* \*